United States Patent
Tien et al.

(10) Patent No.: US 10,473,851 B2
(45) Date of Patent: Nov. 12, 2019

(54) OPTICAL FILM AND DISPLAY MODULE

(71) Applicant: AU OPTRONICS CORPORATION, Hsin-Chu (TW)

(72) Inventors: Kun-Cheng Tien, Hsin-Chu (TW); Yu-Hsuan Hung, Hsin-Chu (TW); Meng-Lin Tsai, Hsin-Chu (TW); Chin-An Lin, Hsin-Chu (TW); Wei-Cheng Wong, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/232,355

(22) Filed: Dec. 26, 2018

(65) Prior Publication Data

US 2019/0212490 A1 Jul. 11, 2019

Related U.S. Application Data

(60) Provisional application No. 62/614,911, filed on Jan. 8, 2018.

(30) Foreign Application Priority Data

Jul. 13, 2018 (TW) .............................. 107124369 A

(51) Int. Cl.
- *F21V 8/00* (2006.01)
- *G02F 1/1337* (2006.01)
- *G02B 5/00* (2006.01)

(52) U.S. Cl.
CPC ........... *G02B 6/0095* (2013.01); *G02B 5/003* (2013.01); *G02F 1/133711* (2013.01)

(58) Field of Classification Search
None
See application file for complete search history.

(56) References Cited

U.S. PATENT DOCUMENTS 9,791,709 B1 * 10/2017 Ouderkirk ............. H01L 31/054
2013/0135750 A1 * 5/2013 Walker, Jr. ............. G02B 5/206
359/641

(Continued)

FOREIGN PATENT DOCUMENTS

CN 200410038455.9 12/2004
CN 201210138316.8 11/2014

(Continued)

OTHER PUBLICATIONS

Office action from the TIPO dated Mar. 7, 2019.

*Primary Examiner* — Elmito Breval
(74) *Attorney, Agent, or Firm* — WPAT, PC

(57) ABSTRACT

The present invention provides an optical film. The optical film includes a first light-guiding layer, a second light-guiding layer, and at least one light absorption member. The first light-guiding layer has a first light incident surface, a first light-emitting surface, and an accommodating recessed portion formed on the first light incident surface. The second light-guiding layer is disposed on the first light incident surface, and has a second light incident surface, a second light-emitting surface, and a light-guiding member formed on the second light-emitting surface. Each light-guiding member is disposed on each accommodating recessed portion respectively, and each light-guiding member has a top portion, a bottom portion, and a side surface connecting the top portion and the bottom portion. The side surface of the light-guiding member faces the inner wall surface of the accommodating recessed portion, and the bottom portion of the light-guiding member corresponds to the opening of the accommodating recessed portion. The light absorption member covers the side surface. The first light-guiding layer has a first refractive index, and the second light-guiding (Continued)

layer has a second refractive index less than the first refractive index.

10 Claims, 8 Drawing Sheets

(56) References Cited

U.S. PATENT DOCUMENTS

| | | | | |
|---|---|---|---|---|
| 2015/0009563 A1* | 1/2015 | Lauters | .................. | G02B 5/003 |
| | | | | 359/485.03 |
| 2016/0178812 A1* | 6/2016 | Gao | ....................... | G02B 5/003 |
| | | | | 257/88 |

FOREIGN PATENT DOCUMENTS

| | | |
|---|---|---|
| CN | 201610395404.4 | 6/2016 |
| JP | 7-64071 A | 3/1995 |

\* cited by examiner

US 10,473,851 B2

OPTICAL FILM AND DISPLAY MODULE

FIELD OF THE INVENTION

The present invention relates to an optical film and a display module; more particularly, to an optical film and a display module that increase a light-emitting angle.

BACKGROUND OF THE INVENTION

In conventional liquid crystal displays, when liquid crystal molecules in the dark state are arranged perpendicular to a light source, the birefringence property of the liquid crystal molecules may enable light of a relatively large incident angle to pass through and to be emitted out of a screen. Consequently, light leakage at large viewing angles is observed in the displays.

With respect to the foregoing problem, the prior art provides a technical solution, in which an optical film layer having an optical lens structure is disposed on a light-emitting surface of a liquid crystal layer. The optical lens structure has a refractive index lower than that of the optical film layer such that the light emitting angle of incident light can be increased, thereby diverging incident light beams. However, the optical lens in the foregoing technical solution has disadvantages. For example, when light is incident into a side edge of the optical lens at a relatively large incident angle, the light will be totally reflected off the side surface of the lens structure when the incident angle exceeds a critical value since the light is incident from a medium of higher refractive index to that of a lower refractive index, and the reflected light will be emitted out of the display along a front view direction of the display. Consequently, the contrast ratio of the display along the front view direction is reduced.

SUMMARY OF THE INVENTION

Based on the above, one of the objectives of the present invention is to provide an optical film and a display module in light of the deficiencies of the prior art, in which a light diverging structure thereof can improve the contrast ratio in a front view direction.

One of the technical solutions provided in the embodiments of the present invention is to provide an optical film applicable to a display module. The optical film includes a light-guiding layer, at least one light-guiding member, and at least one light absorption member. The light-guiding layer has a light incident surface, a light-emitting surface facing away from the light incident surface, and at least one accommodating recessed portion formed on the light incident surface, where the accommodating recessed portion has an inner wall surface and an opening. Each light-guiding member is disposed on each accommodating recessed portion, and each light-guiding member has a top, a bottom away from the top portion, and a side surface connecting the top portion and the bottom portion. The side surface of the light-guiding member faces the inner wall surface of the accommodating recessed portion, and the bottom portion of the light-guiding member corresponds to the opening of the accommodating recessed portion. The at least one light absorption member is disposed between the side surface of the at least one light-guiding member and the light-guiding layer, and the light absorption member covers the side surface. The light-guiding layer has a fourth refractive index, each light-guiding member has a fifth refractive index, and the fourth refractive index is greater than the fifth refractive index.

Another technical solution provided in the embodiments of the present invention is to provide an optical film applicable to a display module. The optical film includes a first light-guiding layer, a second light-guiding layer, and at least one light absorption member. The first light-guiding layer has a first light incident surface, a first light-emitting surface facing away from the first light incident surface, and at least one accommodating recessed portion formed on the first light incident surface, where the accommodating recessed portion has an inner wall surface and an opening. The second light-guiding layer is disposed on the first light incident surface, and has a second light incident surface, a second light-emitting surface facing away from the second light incident surface, and at least one light-guiding member formed on the second light-emitting surface. Each light-guiding member is disposed on each accommodating recessed portion, and each light-guiding member has a top, a bottom portion away from the top portion, and a side surface connecting the top portion and the bottom portion. The side surface of the light-guiding member faces the inner wall surface of the accommodating recessed portion, and the bottom portion of the light-guiding member corresponds to the opening of the accommodating recessed portion. The at least one light absorption member is disposed between the side surface of the at least one light-guiding member and the first light-guiding layer, and the light absorption member covers the side surface. The first light-guiding layer has a first refractive index, the second light-guiding layer has a second refractive index, and the first refractive index is greater than the second refractive index.

To further learn the features and technical content of the present invention, refer to the following detailed descriptions and drawings related to the present invention. However, the provided drawings are used only for providing reference and descriptions, and are not intended to limit the present invention.

DETAILED DESCRIPTION OF THE PREFERRED EMBODIMENTS

The following describes implementations of an optical film disclosed in the present invention by using specific embodiments in cooperation with FIG. 1 to FIG. 16. A person skilled in the art can learn advantages and effects of the present invention based on the content disclosed in this specification. However, the content disclosed below is not intended to limit the protection scope of the present invention. Without departing from the spirit of the conception of the present invention, a person skilled in the art can implement the present invention based on different viewpoints and applications by using other different embodiments. In addition, it needs to be stated in advance that the accompanying drawings of the present invention are only for illustrative purposes and are not depicted based on actual dimensions. In addition, although various elements in this specification may be described by using terms such as first, second, and third, these elements should not be limited by these terms. These terms are mainly used for distinguishing between elements.

First Embodiment

An optical film U provided in the present invention is described below with reference to the corresponding drawings. First, referring to FIG. 1, the present embodiment provides an optical film U applicable to a display module Z. The display module Z has a display panel D and the optical film U. The optical film U is disposed on a display surface S of the display panel D. The display module Z is preferably a liquid crystal display module. However, the present invention is not limited thereto.

Figure 1:
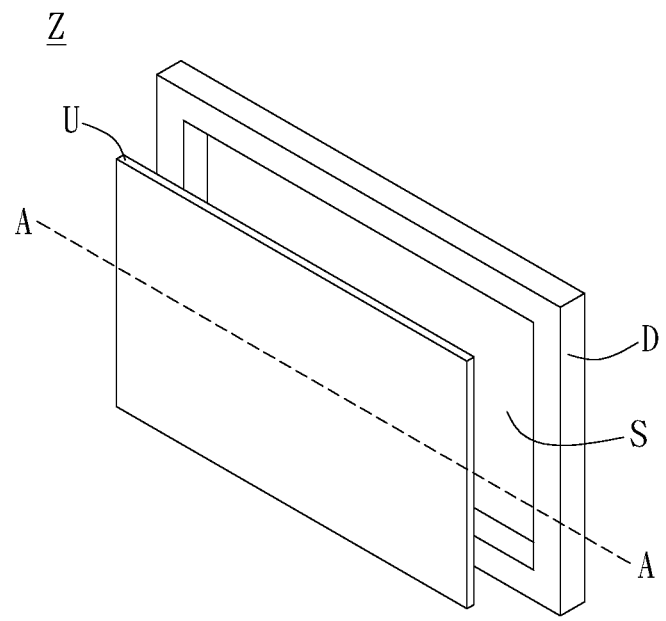
FIG. 1 is a three-dimensional schematic diagram of a display module according to a first embodiment of the present invention.
Figure 2:
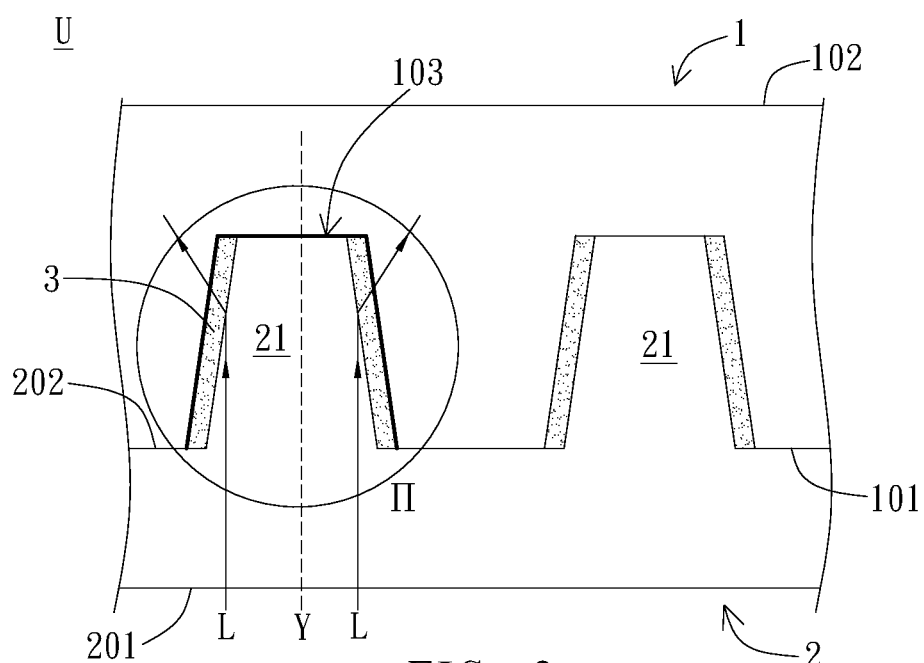
FIG. 2 is an enlarged schematic diagram of an optical film according to the first embodiment of the present invention.

FIG. 2 is a schematic cross-sectional view of the optical film U in FIG. 1 along a section line A-A. As shown in FIG. 2, the optical film U includes a first light-guiding layer 1, a second light-guiding layer 2, and a light absorption member 3. The first light-guiding layer 1 has a first light incident surface 101, a first light-emitting surface 102 facing away from the first light incident surface 101, and an accommodating recessed portion 103 formed on the first light incident surface 101. The second light-guiding layer 2 is disposed on the first light incident surface 101, and has a second light incident surface 201, a second light-emitting surface 202 facing away from the second light incident surface 201, and a light-guiding member 21 formed on the second light-emitting surface 202. It should be noted that FIG. 2 is an enlarged schematic diagram of the optical film U, where only two light-guiding members 21 are drawn as an example. In actual application, the number of light-guiding members 21 is not limited in the present invention.

Figure 3:
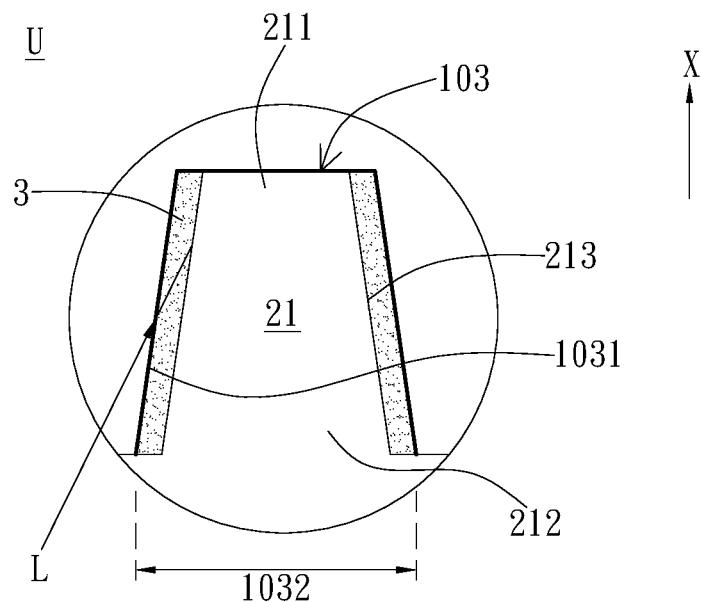
FIG. 3 is a partial enlarged view of FIG. 2

Please refer to FIG. 2 and FIG. 3, wherein FIG. 3 is a partial enlarged view of FIG. 2. In detail, the accommodating recessed portion 103 has an inner wall surface 1031 and an opening 1032. The light-guiding member 21 has a top 211, a bottom 212, and a side surface 213 connecting the top portion 211 and the bottom portion 212, and each light-guiding member 21 is disposed on each accommodating recessed portion 103 with the side surface 213 facing the inner wall surface 1031 and with the bottom portion 212 corresponding to the opening 1032. Specifically, in this embodiment, a cross section of the light-guiding member 21 is trapezoidal, the side surface 213 of the light-guiding member 21 is inclined to an axial direction Y, the shape of the inner wall surface 1031 approximately matches that of the light-guiding member 21, and the inner wall surface 1031 is inclined to the axial direction Y of the light-guiding member 21. The light-guiding members 21 may be distributed on the second light-emitting surface 202 in a regular or irregular pattern. When viewed from the top, the light-guiding members 21 may have a punctuate distribution or a strip-shaped distribution. The light absorption member 3 is disposed between the side surface 213 of the light-guiding member 21 and the first light-guiding layer 1, and covers the side surface 213 of the light-guiding member 21.

In the structure of FIG. 2 and FIG. 3, the first light-guiding layer 1 has a first refractive index, and the second light-guiding layer 2 has a second refractive index, in which the first refractive index is greater than the second refractive index. As indicated by an advancing direction of light L in FIG. 2, since the first refractive index is greater than the second refractive index, the light L that enters the light-guiding member 21 from the second light incident surface 201 may be refracted as deviating from the axial direction Y of the light-guiding member 21 such that the incident light L is diverged. Furthermore, the light absorption member 3 is formed by a light absorption material, and can absorb the light L that enters the light-guiding member at the side surface 213. As indicated by the advancing direction of light L in FIG. 3, in this way, the light L may be prevented from being totally reflected on the side surface 213 so as not to be refracted toward a front view direction X. In this embodiment, the light absorption member 3 has a third refractive index, and the third refractive index is equal to the first refractive index. In this way, the light L may be prevented from being totally reflected toward the front view direction X at a junction between the first light-guiding layer 1 and the light absorption member 3 due to a difference between refractive indexes. The light absorption member 3 may be formed on the light-guiding member 21 by means of, for example, a deposition process or a lithography process. However, the present invention is not limited thereto.

Figure 4:
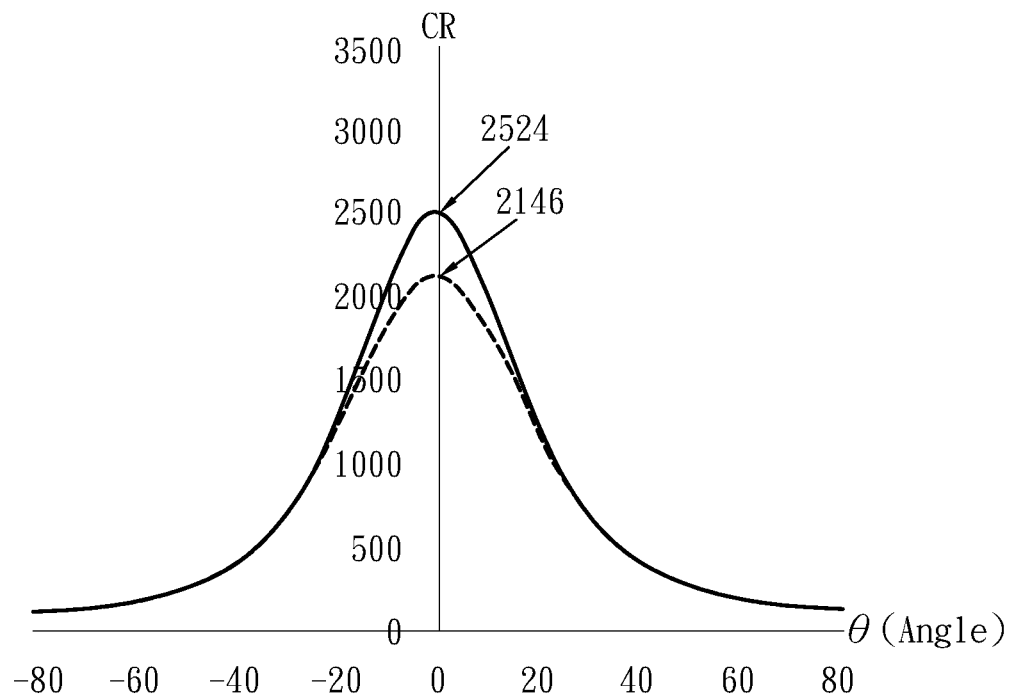
FIG. 4 shows contrast ratios of an optical film of FIG. 3 and an optical film from which a light absorption member is removed at different viewing angles.

FIG. 4 shows contrast ratios of the optical film U of this embodiment and an optical film U from which a light absorption member 3 is removed at different viewing angles. The optical film U of this embodiment is represented by using a solid line, and the optical film U from which the light absorption member 3 is removed is represented by using a dotted line. In FIG. 4, a viewing angle θ is in a unit of degree, and a contrast ratio (CR) is a ratio of the luminance of black displayed by the display module Z to that of white displayed by the display module Z. As shown in the figure, a peak of the solid line is 2524, and a peak of the dotted line is 2146, indicating that when the viewing angle θ is zero degrees, the optical film U provided with the light absorption member 3 on the side surface 213 of the light-guiding member 21 has a front view contrast ratio higher than that of the optical film U from which the light absorption member 3 is removed. Specifically, the "front view contrast ratio" refers to a ratio of the luminance of black displayed by the display module Z to that of white displayed by the display module Z when the viewing angle θ is zero degrees.

It should be noted that in this embodiment, the third refractive index is equal to the first refractive index. However, the present invention is not limited thereto. In a varied embodiment of the present invention, the third refractive index may be preferably any value in a range greater than the second refractive index and less than the first refractive index. Specifically, when the refractive index of the light absorption member 3 is less than or equal to the second refractive index, when the light enters the light absorption member 3 from the light-guiding member 21, some of the light is totally reflected to be refracted toward the front view direction X, leading to a decrease in the front view contrast ratio. In addition, when the refractive index of the light absorption member 3 is less than or equal to the second refractive index, when the light L enters the first light-guiding layer 1 from the top of the light absorption member 3, the light is refracted toward the front view direction X. Consequently, an adverse effect of reducing the front view contrast ratio is generated. On the other hand, if the refractive index of the light absorption member 3 is greater than the first refractive index, the light is easily reflected in the light absorption member 3 for a plurality of times and emitted toward the front view direction X, or when the light enters the first light-guiding layer 1 from the light absorption member 3, the light is refracted toward the front view direction X, and therefore the front view contrast ratio is reduced. Therefore, in a preferred embodiment of the present invention, the third refractive index is greater than the second refractive index and less than or equal to the first refractive index. In this way, the light absorption member 3 can effectively absorb the light that is refracted toward the front view direction from the side surface 213, thereby further improving the front view contrast ratio of the optical film U.

Figure 5:
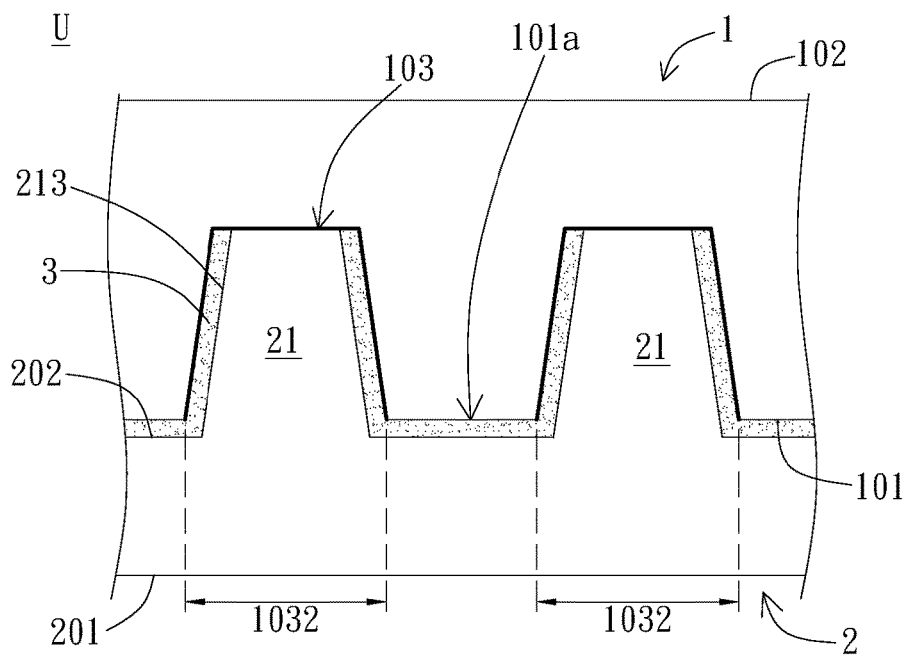
FIG. 5 is an enlarged schematic diagram of a varied embodiment of the optical film according to the first embodiment of the present invention

FIG. 5 shows an optical film U of a varied embodiment of the present invention. In this varied embodiment, the light absorption member 3 is further disposed in a connection zone 101a between two accommodating recessed portions 103 on the first light incident surface 101. Specifically, referring to FIG. 5, the connection zone 101a is located between two adjacent openings 1032, and the light absorption member 3 extends from the side surface 213 of the light-guiding member 21 to cover the connection zone 101a, so that the connection zone 101a is adjacent to the second light-emitting surface 202 with the light absorption member 3 located therebetween. When observed from the top, the light-guiding members 21 having a punctuate distribution or a strip-shaped distribution and the second light-emitting surface 202 between the light-guiding members 21 may be considered to be covered by the light absorption member 3. In this varied embodiment, the light absorption member 3 is also disposed in the connection zone 101a so that as compared with the foregoing embodiment, the light incident to a junction between the light-guiding member 21 and the second light-emitting surface 202 may be further absorbed, thereby further improving the front view contrast ratio of the optical film U.

Figure 6:
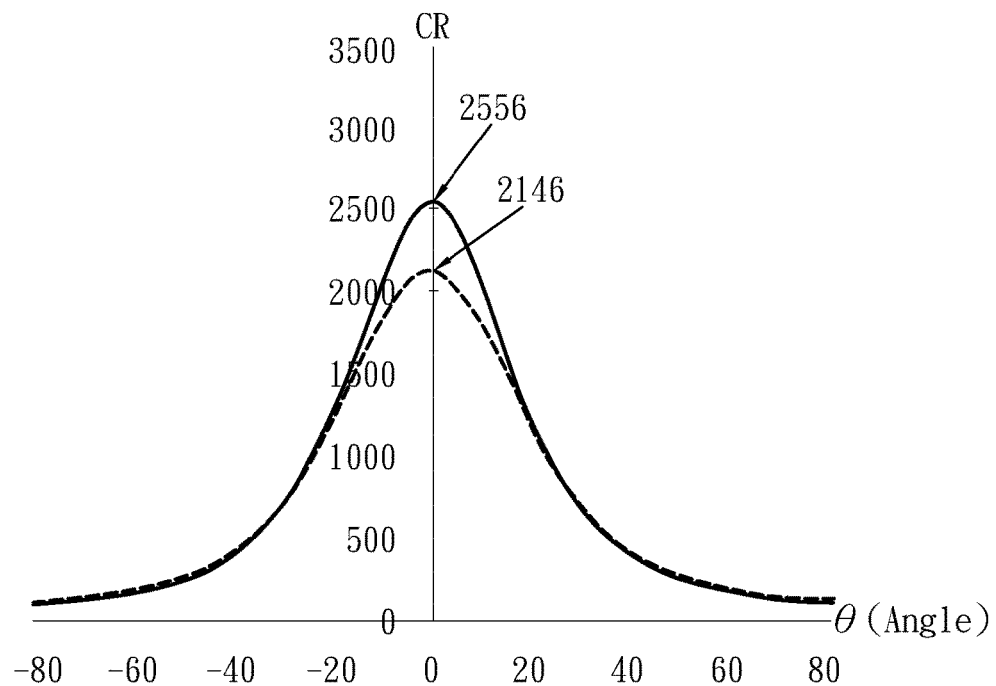
FIG. 6 shows contrast ratios of an optical film of FIG. 5 and an optical film from which a light absorption member is removed at different viewing angles.

FIG. 6 shows contrast ratios of the optical film U (shown with a solid line) of FIG. 5 and the optical film U (shown with a dotted line) from which the light absorption member 3 is removed at different viewing angles. In FIG. 6, a viewing angle θ is in a unit of degree, and a contrast ratio (CR) is a ratio of the luminance of black displayed by the display module Z to that of white displayed by the display module Z. It can be learned from FIG. 6 that a peak of the solid line is 2556, and a peak of the dotted line is 2146, indicating that the optical film U provided with the light absorption member 3 in this embodiment has a front view contrast ratio higher than that of the optical film U from which the light absorption member 3 is removed.

Figure 7:
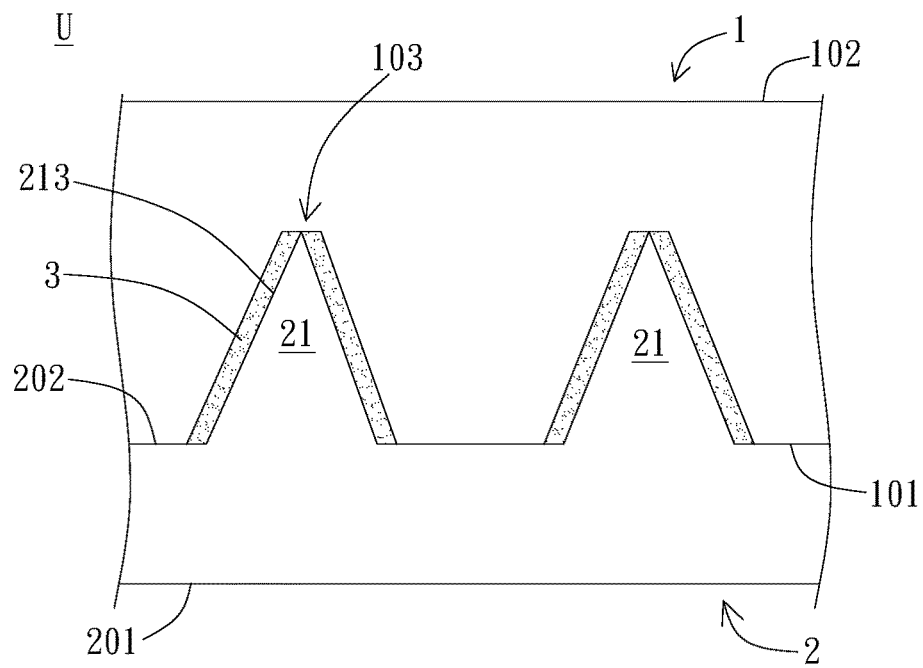
FIG. 7 is an enlarged schematic diagram of another varied embodiment of the optical film according to the first embodiment of the present invention.
Figure 8:
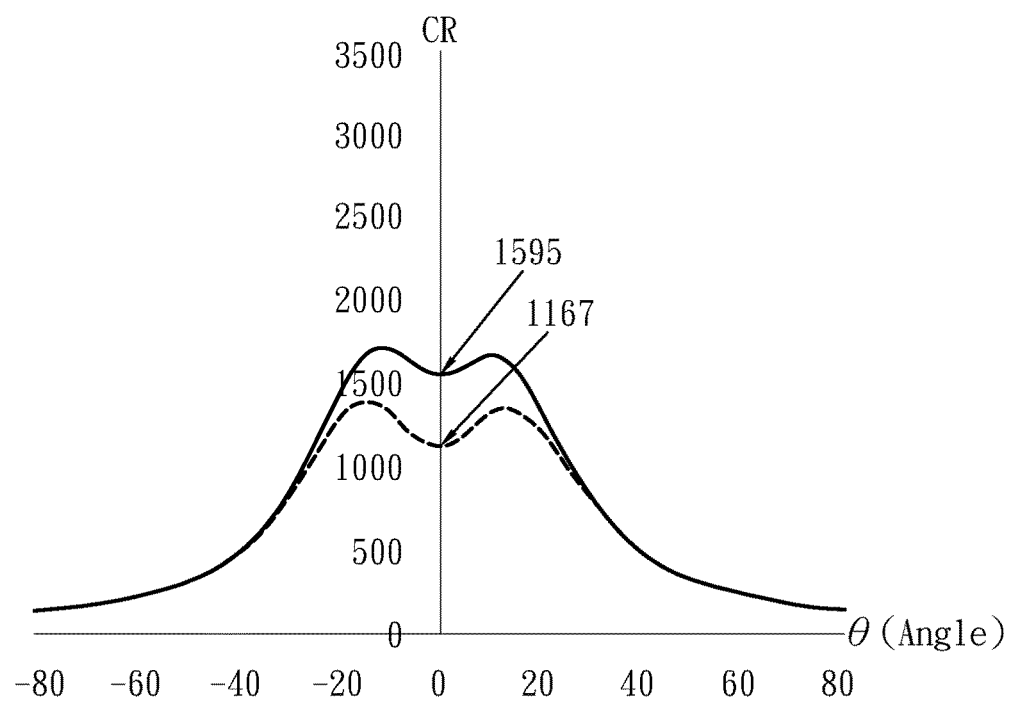
FIG. 8 shows contrast ratios of an optical film of FIG. 7 and an optical film from which a light absorption member is removed at different viewing angles.

Refer to FIG. 7 and FIG. 8. The shape of the light-guiding member 21 is not limited in the present invention. In a varied embodiment of FIG. 7, a cross section of the light-guiding member 21 may be triangular. Specifically, when viewed from the top, the light-guiding members 21 may have a strip-shaped distribution or a punctuate distribution, and in case of punctuate distribution, the light-guiding member 21 of this embodiment may be a cone or a tetragonal cone. The present invention is not limited thereto. As shown in FIG. 8, when the viewing angle is zero degrees, the contrast ratio CR of the optical film U (shown with a solid line) having the light absorption member 3 is 1595, while when the viewing angle is zero degrees, the peak of the contrast ratio of the optical film U (shown with a dotted line) from which the light absorption member 3 is removed is 1167, indicating that the optical film U having the light absorption member 3 has a front view contrast ratio higher than that of the optical film U from which the light absorption member 3 is removed.

Figure 9:
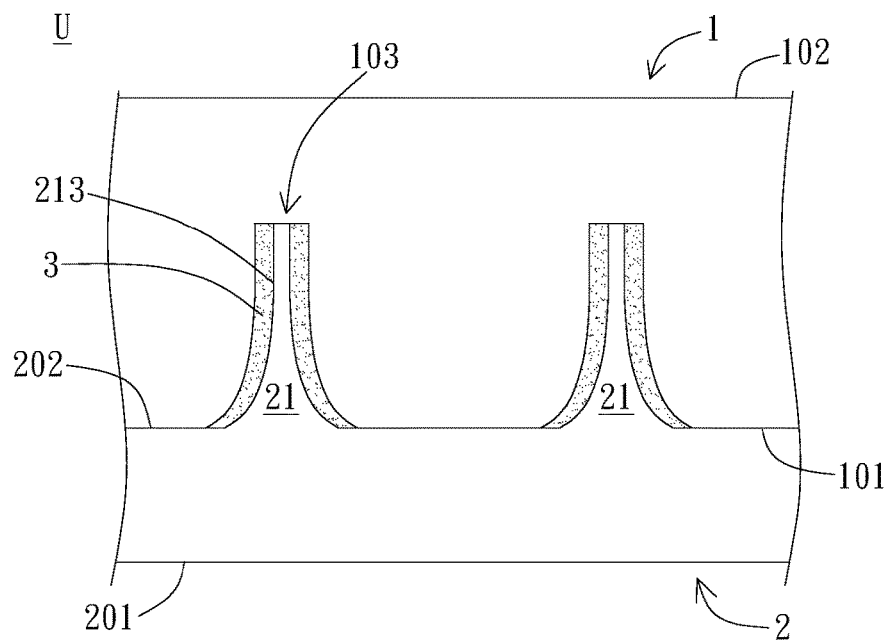
FIG. 9 is an enlarged schematic diagram of another varied embodiment of the optical film according to the first embodiment of the present invention.
Figure 10:
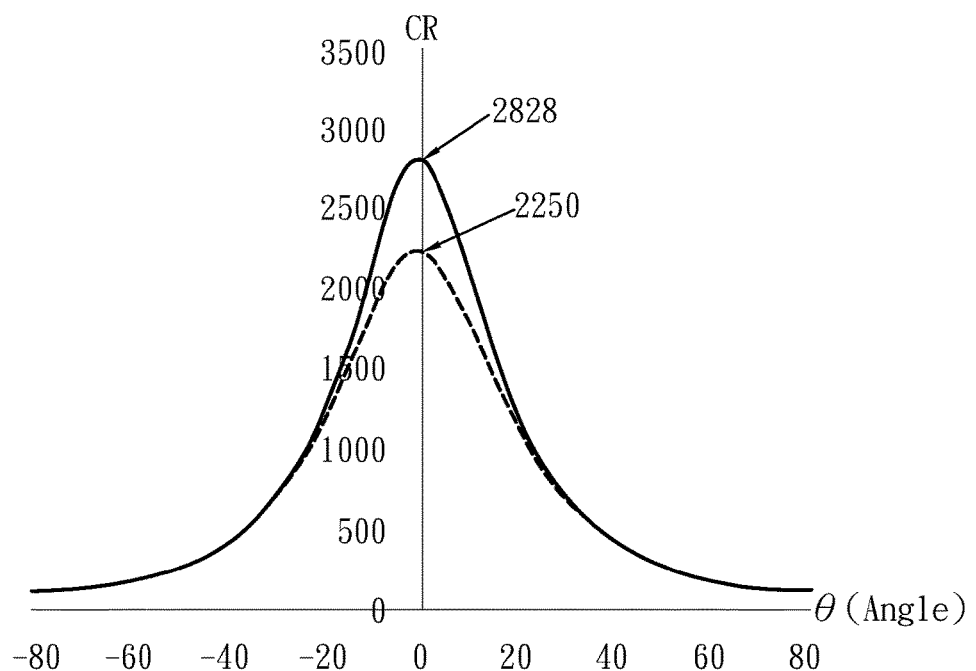
FIG. 10 shows contrast ratios of an optical film of FIG. 9 and an optical film from which a light absorption member is removed at different viewing angles.

In another varied embodiment of the present invention, a cross section of the light-guiding member 21 of the optical film U may be of a shape of a column having a concave side surface. In addition, when viewed from the top, the light-guiding members 21 may have a strip-shaped distribution or a punctuate distribution, as shown in FIG. 9. As shown in FIG. 10, in this varied embodiment, the optical film U (shown with a solid line) having the light absorption member 3 has a front view contrast ratio higher than that of the optical film U (shown with a dotted line) from which the light absorption member 3 is removed. In addition, referring to FIG. 4 and FIG. 10, compared with the trapezoidal light-guiding member 21 in FIG. 2, the columnar light-guiding member 21 having a concave side surface of this varied embodiment can reach a relatively high front view contrast ratio (the front view contrast ratio shown in FIG. 10 is 2828, and the front view contrast ratio shown in FIG. 4 is 2524). This is because the columnar light-guiding member 21 having a concave side surface makes a path of the light incident to the side surface 213 in the light absorption member 3 relatively long in a manner such that the front view contrast ratio can be improved more effectively.

Figure 11:
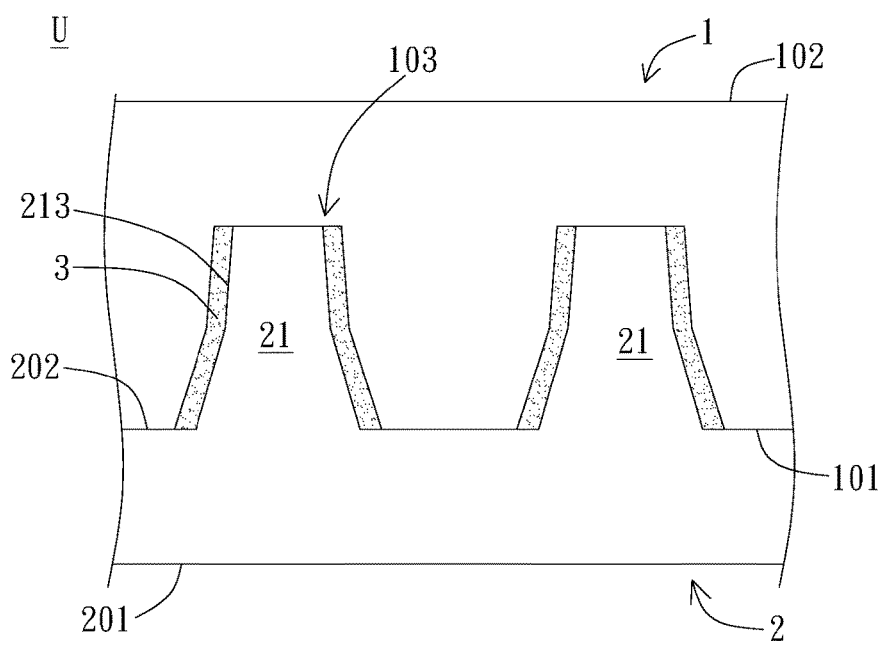
FIG. 11 is an enlarged schematic diagram of another varied embodiment of the optical film according to the first embodiment of the present invention.
Figure 12:
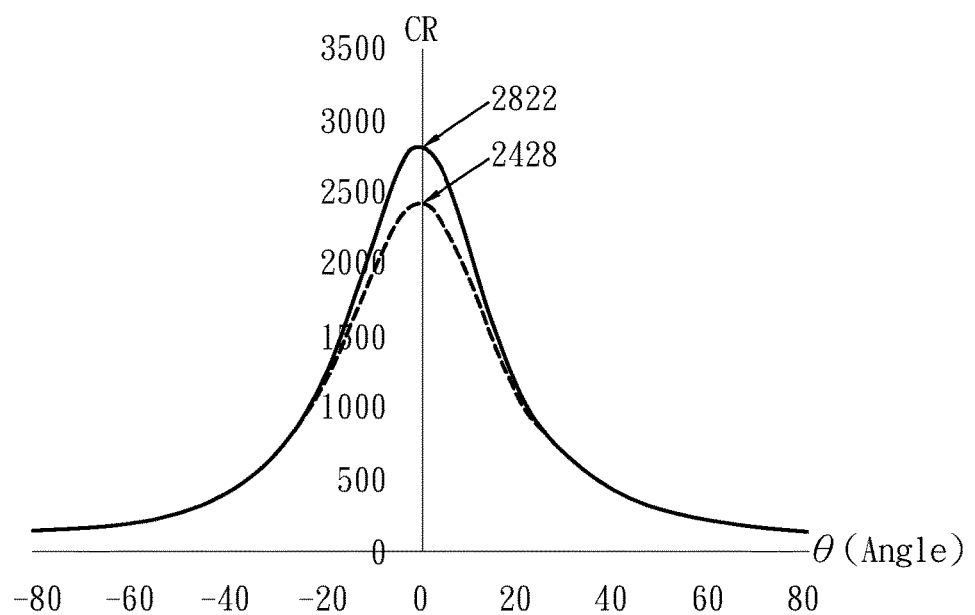
FIG. 12 shows contrast ratios of an optical film of FIG. 11 and an optical film from which a light absorption member is removed at different viewing angles.

In another varied embodiment of the present invention, when viewed from a side surface, the light-guiding member 21 of the optical film U may be a trapezium formed by combining bevels with two different slopes. A bezel having a lower slope is closer to the second light-emitting surface 202, as shown in FIG. 11. For example, when viewed from the top, the light-guiding members 21 may have a strip-shaped distribution or a punctuate distribution, and in case of the punctuate distribution, when viewed from a three-dimensional angle, the light-guiding member 21 may be a truncated cone or a truncated tetrahedron. This is not limited in the present invention. FIG. 12 shows contrast ratios of the optical film U of FIG. 11 and the optical film U from which the light absorption member 3 is removed at different viewing angles. Referring to FIG. 4 and FIG. 12, as compared with the trapezoidal light-guiding member 21, because the light-guiding member 21 of this varied embodiment has a relatively large bevel area, the front view contrast ratio can be preferably improved (the front view contrast ratio shown in FIG. 12 is 2822, and the front view contrast ratio shown in FIG. 4 is 2524).

Figure 13:
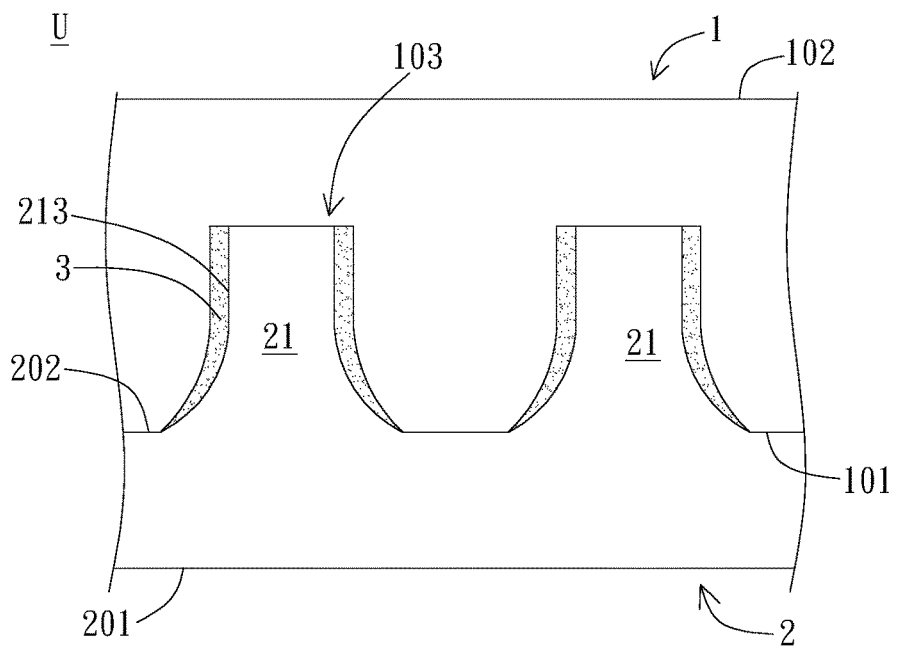
FIG. 13 is an enlarged schematic diagram of another varied embodiment of the optical film according to the first embodiment of the present invention.
Figure 14:
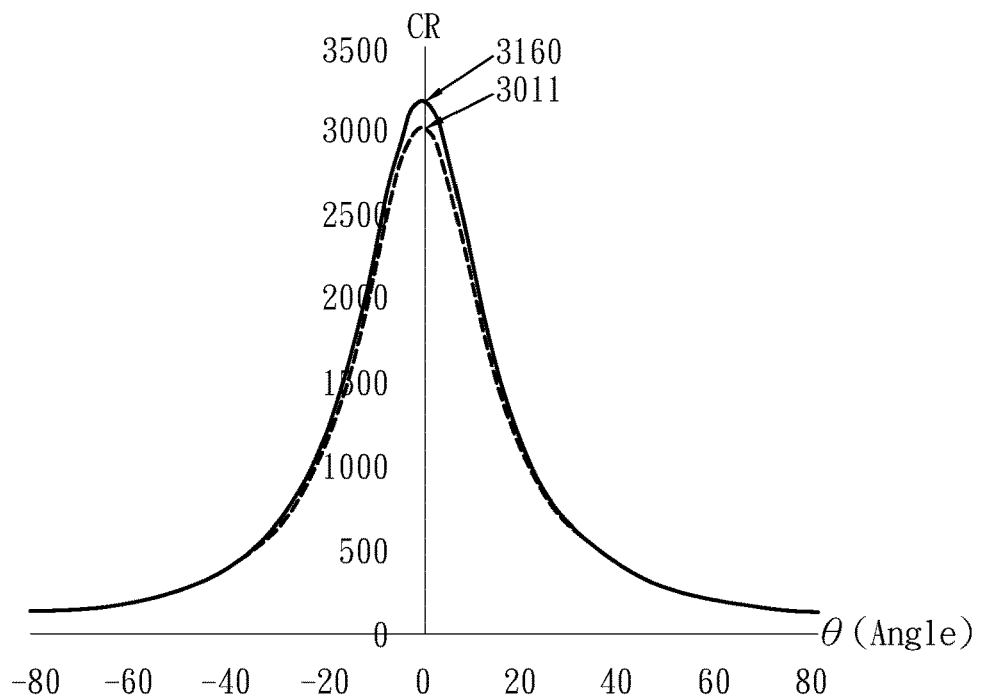
FIG. 14 shows contrast ratios of an optical film of FIG. 13 and an optical film from which a light absorption member is removed at different viewing angles.

In another varied embodiment of the present invention, the light-guiding member 21 may also be shown in FIG. 13, and when viewed from the side surface, the light-guiding member 21 is of a shape of forming a concave surface on a trapezoidal bevel. As compared with the varied embodiment of FIG. 11, in this varied embodiment, there is a larger bezel area, and therefore a higher front view contrast ratio can be provided. As shown in FIG. 14, FIG. 14 shows contrast ratios CR of the optical film U (shown with a solid line) of this varied embodiment and the optical film U (shown with a dotted line) of this embodiment from which the light absorption member 3 is removed at different viewing angles θ; the peak of the solid line is 3160, and represents the front view contrast ratio of the optical film U of this varied embodiment, and the peak of the dotted line is 3011, and represents the front view contrast ratio of the optical film U of this varied embodiment from which the light absorption member 3 is removed.

Figure 15:
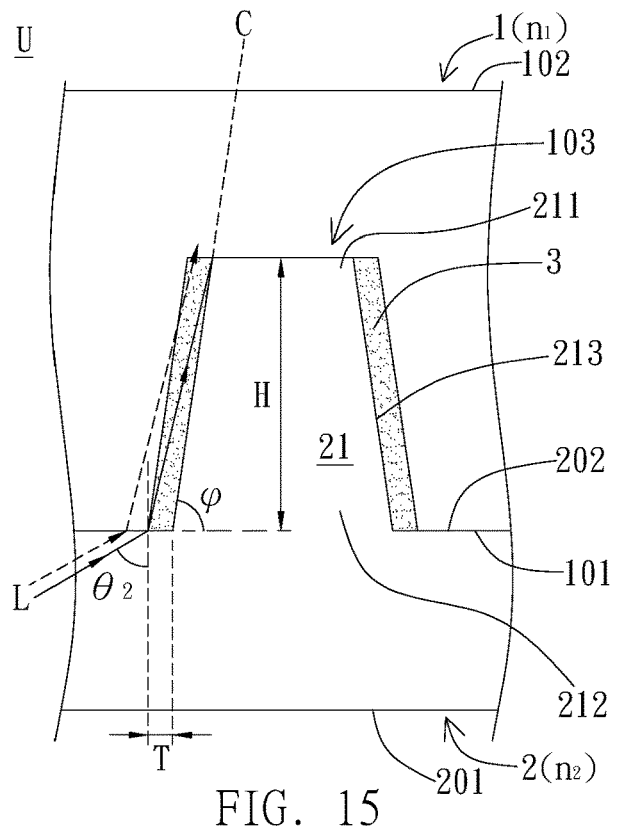
FIG. 15 is a partial enlarged schematic diagram of the optical film according to the first embodiment of the present invention.

Referring to FIG. 15, in this embodiment, the light absorption member 3 has a maximum thickness T. In this embodiment, the maximum thickness T refers to the thickness of the light absorption member 3 in a direction parallel to the second light-emitting surface 202. The maximum thickness T satisfies the following relationship:

$$0 < T < \frac{H}{\tan\left(90° - \sin^{-1}\left(\sin\theta_2 \times \frac{n_2}{n_1}\right)\right)} - \frac{H}{\tan\varphi}$$

Referring to FIG. 15, in the foregoing formula, H is a distance between the top portion 211 and the bottom portion 212 of the light-guiding member 21, $n_1$ is the first refractive index, $n_2$ is the second refractive index, $\theta_2$ is an incident angle by which a light is incident to the first light-guiding layer 1 from the second light-guiding layer 2, and $\varphi$ is an angle between a tangent C of the side surface and the bottom portion 212. In this embodiment, the tangent C is a tangent along the side surface 213 of the light-guiding member 21. In other embodiments, when the side surface 213 of the light-guiding member 21 is not a plane, and is, for example, a convex curved surface or a concave curved surface, the light L that is incident to the light absorption member 3 by a maximum incident angle $\theta_2$ and that has a unique intersection point with the side surface 213 of the light-guiding member 21 may be considered to overlap the tangent C.

As shown in FIG. 15, specifically, the maximum incident angle $\theta_2$ refers to an incident angle when the light L is incident from an edge of the bottom of the light absorption member 3 and is emitted out of the light absorption member 3 from an edge of the top portion 211 of the light-guiding member 21. When the thickness of the light absorption member 3 is close to the maximum value in the foregoing relational expression, the light absorption member 3 can absorb all lights that may possibly be totally reflected on the side surface of the light-guiding member, so that an optimal light absorption effect and an effect of improving a front view contrast ratio can be achieved. It can be understood that if the thickness of the light absorption member 3 exceeds the foregoing maximum value, lights that are not totally reflected originally are additionally absorbed. Consequently, the transmittance of the first light-guiding layer 1 decreases, and improvement of the front view contrast ratio is not facilitated.

By using the foregoing technical means, the light absorption member 3 of the optical film U of this embodiment can absorb the light that is incident to the light-guiding member 21 from the side surface 213, so that the probability that the light L is totally reflected on the side surface 213 is reduced, thereby improving the front view contrast ratio of the display module Z. In addition, in this embodiment, the refractive index of the light absorption member 3 is equal to the refractive index of the first light-guiding layer 1, to prevent the light incident to the side surface of the 213 of the light-guiding member 21 from the first light-guiding layer 1 from being totally reflected.

Second Embodiment

Figure 16:
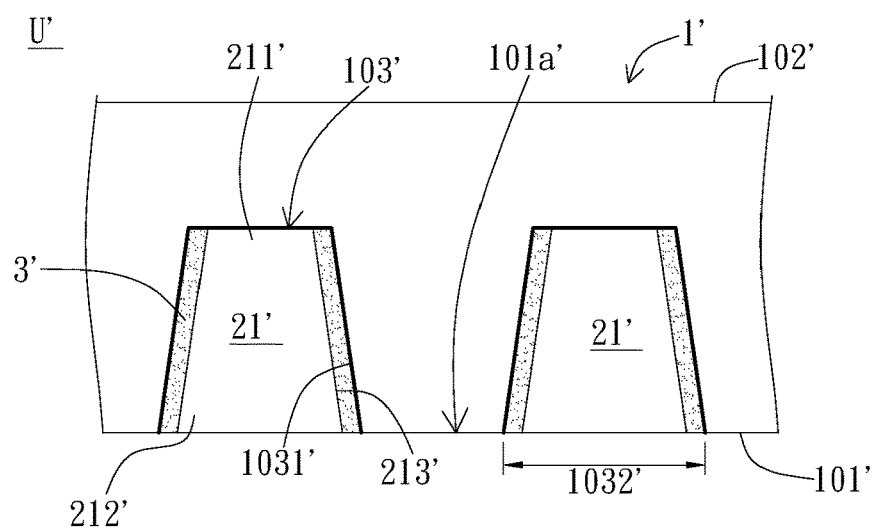
FIG. 16 is an enlarged schematic diagram of an optical film according to a second embodiment of the present invention.

Referring to FIG. 16, this embodiment mainly differs from the foregoing embodiment in that, the optical film U provided in the foregoing embodiment has the first light-guiding layer 1 and the second light-guiding layer 2, and the plurality of light-guiding members 21 is formed on the second light-emitting surface 202 of the second light-guiding layer 2; an optical film U of this embodiment includes only one light-guiding layer 1', and a plurality of light-guiding members 21' is accordingly formed on each accommodating recessed portion 103 of a light incident surface 101' of the light-guiding layer 1'. In this embodiment, the light-guiding member 21' is also disposed on the accommodating recessed portion 103' with a side surface 213' facing an inner wall surface 1031' of the accommodating recessed portion 103' and with a bottom 212' corresponding to an opening 1032'. The light-guiding layer 1' has a fourth refractive index $n_4$, the light-guiding member 21' has a fifth refractive index $n_5$, the fourth refractive index $n_4$ is greater than the fifth refractive index $n_5$, and a light absorption member 3' covers the side surface 213' of the light-guiding member 21'. Like the first embodiment, this embodiment may have a varied embodiment in which the light absorption member 3' extends out of the side surface 213' to cover a connection zone 101a'. In addition, the light-guiding member 21' of this embodiment may also be changed in shape like the first embodiment. The present invention is not limited thereto.

In conclusion, according to the optical film (U, U') and the display module Z that are provided in the embodiments of the present invention, by means of the technical solutions "each light-guiding member (21, 21') is disposed on each accommodating recessed portion (103, 103') respectively", "the light absorption member 3' is disposed between the side surface 213' of the light-guiding member 21' and the light-guiding layer 1', and the light absorption member 3' covers the side surface 213'", and "the light absorption member 3 is disposed between the side surface 213 of the light-guiding member 21 and the first light-guiding layer 1, and the light absorption member 3 covers the side surface 213", the probability that the light L is totally reflected when incident to the side surface (213, 213') of the light-guiding member (21, 21') is reduced, thereby further improving the front view contrast ratio of the display module Z.

In addition, according to the embodiments of the present invention, the refractive index $n_3$ of the light absorption member 3 is equal to the refractive index $n_1$ of the first light-guiding layer 1, and the refractive index $n_6$ of the light absorption member 3' is equal to the refractive index $n_4$ of the light-guiding layer 1' such that the probability that the light L is totally reflected at the junction between the first light-guiding layer 1 and the light absorption member 3 and at the junction between the light-guiding layer 1' and the light absorption member 3' can be reduced, thereby further improving the front view contrast ratio of the display module Z. The light absorption member 3 may be further disposed in the connection zone 101a between the two accommodating recessed portions 103 on the first light incident surface 101, or the light absorption member 3' may be further disposed in the connection zone 101a' between the two accommodating recessed portions 103' on the light incident surface 101', to further improve the front view contrast ratio of the optical film (U, U').

In addition, according to the embodiments of the present invention, the refractive index $n_3$ of the light absorption member 3 is equal to the refractive index $n_1$ of the first light-guiding layer 1, and the refractive index $n_6$ of the light absorption member 3' is equal to the refractive index $n_4$ of the light-guiding layer 1' such that the probability that the light L is totally reflected at the junction between the first light-guiding layer 1 and the light absorption member 3 and at the junction between the light-guiding layer 1' and the light absorption member 3' can be reduced, thereby further improving the front view contrast ratio of the display module Z. The light absorption member 3 may be further disposed in the connection zone 101a between the two accommodating recessed portions 103 on the first light incident surface 101, or the light absorption member 3' may be further disposed in the connection zone 101a' between the two accommodating recessed portions 103' on the light incident surface 101' to further improve the front view contrast ratio of the optical film (U, U').

The descriptions illustrated supra set forth simply the embodiments of the instant disclosure, and the characteristics of the present invention are by no means restricted thereto. All changes, alterations, or modifications conveniently considered by those skilled in the art are deemed to be encompassed within the scope of the instant disclosure delineated by the following claims.

What is claimed is:

1. An optical film applicable to a display module, wherein the optical film comprises:
   a light-guiding layer, having a light incident surface, a light-emitting surface facing away from the light incident surface, and at least one accommodating recessed portion formed on the light incident surface, wherein the accommodating recessed portion has an inner wall surface and an opening;
   at least one light-guiding member, wherein each light-guiding member is disposed on each accommodating recessed portion respectively, and each light-guiding member has a top portion, a bottom portion away from the top portion, and a side surface connecting the top portion and the bottom portion, in which the side surface of the light-guiding member faces the inner wall surface of the accommodating recessed portion, and the bottom portion of the light-guiding member corresponds to the opening of the accommodating recessed portion; and
   at least one light absorption member, wherein the at least one light absorption member is disposed between the side surface of the at least one light-guiding member and the light-guiding layer, and the light absorption member covers the side surface, wherein
   the light-guiding layer has a fourth refractive index, each light-guiding member has a fifth refractive index, and the fourth refractive index is greater than the fifth refractive index.

2. The optical film according to claim 1, wherein the at least one light absorption member has a sixth refractive index, and the sixth refractive index is equal to the fourth refractive index.

3. The optical film according to claim 1, wherein the at least one light absorption member has a sixth refractive index, and the sixth refractive index is not greater than the fourth refractive index, and is not less than the fifth refractive index.

4. The optical film according to claim 1, wherein the light-guiding layer has at least two accommodating recessed portions, and the light incident surface has at least one connection zone located between every two adjacent recessed portion openings, and wherein the light absorption member further covers the connection zone.

5. The optical film according to claim 1, wherein the at least one light absorption member has a maximum thickness T, and the maximum thickness satisfies the following relationship:

$$0 < T < \frac{H}{\tan\left(90° - \sin^{-1}\left(\sin\theta_{in} \times \frac{n_{in}}{n_4}\right)\right)} - \frac{H}{\tan\varphi};$$

wherein H is a distance between the top portion and the bottom portion of the light-guiding member, $n_4$ is the fourth refractive index, $n_{in}$ is a refractive index of a medium where a light is located before the light is incident to the light-guiding layer at the light incident surface at an incident angle $\theta_{in}$, and $\varphi$ is an angle between a tangent of the side surface and the bottom portion.

6. An optical film applicable to a display module, wherein the optical film comprises:
   a first light-guiding layer having a first light incident surface, a first light-emitting surface facing away from the first light incident surface, and at least one accommodating recessed portion formed on the first light incident surface, wherein the accommodating recessed portion has an inner wall surface and an opening;
   a second light-guiding layer disposed on the first light incident surface, wherein the second light-guiding layer has a second light incident surface, a second light-emitting surface facing away from the second light incident surface, and at least one light-guiding member formed on the second light-emitting surface, wherein each light-guiding member is disposed on each accommodating recessed portion respectively, and each light-guiding member has a top portion, a bottom portion away from the top portion, and a side surface connecting the top portion and the bottom portion, and wherein the side surface of the light-guiding member faces the inner wall surface of the accommodating recessed portion, and the bottom portion of the light-guiding member corresponds to the opening of the accommodating recessed portion; and
   at least one light absorption member, wherein the at least one light absorption member is disposed between the side surface of the at least one light-guiding member and the first light-guiding layer, and the light absorption member covers the side surface, wherein the first light-guiding layer has a first refractive index, the second light-guiding layer has a second refractive index, and the first refractive index is greater than the second refractive index.

7. The optical film according to claim 6, wherein the at least one light absorption member has a third refractive index, and the third refractive index is equal to the first refractive index.

8. The optical film according to claim 7, wherein the at least one light absorption member has a third refractive index, and the third refractive index is not greater than the first refractive index, and is not less than the second refractive index.

9. The optical film according to claim 7, wherein the first light-guiding layer has at least two accommodating recessed portions, and the first light incident surface has at least one connection zone disposed between every two adjacent openings, and wherein the light absorption member further covers the connection zone.

10. The optical film according to claim 7, wherein the at least one light absorption member has a maximum thickness T, and the maximum thickness satisfies the following relationship:

$$0 < T < \frac{H}{\tan\left(90° - \sin^{-1}\left(\sin\theta_2 \times \frac{n_2}{n_1}\right)\right)} - \frac{H}{\tan\varphi};$$

wherein H is a distance between the top portion and the bottom portion of the light-guiding member, $n_1$ is the first refractive index, $n_2$ is the second refractive index, $\theta_2$ is an incident angle at which a light is incident to the first light-guiding layer at the second light-guiding layer, and $\varphi$ is an angle between a tangent of the side surface and the bottom portion.

* * * * *